United States Patent [19]

Butterfield

[11] Patent Number: 4,578,941

[45] Date of Patent: Apr. 1, 1986

[54] LOAD CARRYING DEVICE

[75] Inventor: Roger P. Butterfield, County of Seneca, N.Y.

[73] Assignee: Emerson Electric Co., St. Louis, Mo.

[21] Appl. No.: 644,928

[22] Filed: Aug. 27, 1984

[51] Int. Cl.[4] .............................................. F16G 13/06
[52] U.S. Cl. ............................................... 59/84; 59/4; 59/91; 29/413; 474/273
[58] Field of Search ........................ 59/5, 6, 7, 8, 35.1, 59/78, 81, 84, 90, 91, 93, 901; 474/202, 218, 273; 187/9 R; 29/413, 416

[56] References Cited

U.S. PATENT DOCUMENTS 2,020,943  11/1935  Hallquist .................................. 59/78
2,110,226   3/1938  Hill ........................................... 59/78
2,966,878   1/1961  Feiser, Jr. ................................ 59/90

OTHER PUBLICATIONS

"Leaf Chains, Clevises and Sheaves", 12/1/1977, The American Society of Mechanical Engineers, American National Standard, New York, N.Y., pp. iii and 1-3.

Primary Examiner—Daniel C. Crane
Assistant Examiner—David B. Jones
Attorney, Agent, or Firm—Polster, Polster and Lucchesi

[57] ABSTRACT

An overload detection and safety arrangement for a load carrying link chain, including a fuse link having link plates connected by a fuse bar of a tensile strength less than the tensile strength of the remainder of the load carrying chain, the fuse link being laced into the remainder of the chain. The fuse bar is designed to break under predetermined overload conditions, but is positioned and arranged to carry normal tensile loads on the device. A safety link, offset from but substantially parallel to the line of tension through the fuse bar, connects the link plates. The safety link has a tensile strength greater than the tensile strength of the fuse bar and at least substantially equal to the tensile strength of the remainder of the chain, the safety link holding the load when the fuse bar breaks due to overload conditions.

13 Claims, 13 Drawing Figures

LOAD CARRYING DEVICE

BACKGROUND OF THE INVENTION

The present invention relates to a novel load carrying device and, more particularly, to a novel load carrying chain assembly including an overload detection and safety device therefor. It has particular but not exclusive application to chains of the type used in forklifts and the like.

Overload failures that go undetected may result in personal injuries and property damage.

The present invention recognizes that it is most desirable not only to be able to detect overload conditions promptly upon occurrence, but, also, to provide safety means to accommodate such overload conditions when they occur so that sufficient time is available to take the necessary steps to minimize undesireable personal injury and property damages which would otherwise result as a consequence of such overload conditions. The present invention, recognizing these problems and needs, provides an improved overload detection and safety device for load carrying devices, particularly of the chain assembly type, which can be economically and readily manufactured and assembled with a minimum of steps, parts and material, which permits quick, positive and readily visible detection of overload conditions promptly upon occurrence and which provides a positive and promptly acting safety device in the event of an overload condition to allow sufficient time for safety measures to be taken to minimize the undesireable consequences of overload conditions.

Other features of the present invention will become obvious to one skilled in the art upon reading the disclosure herinafter.

BRIEF STATEMENT OF THE INVENTION

In accordance with this invention, generally stated, the present invention provides an improved load carrying device comprising a linear load carrying chain including a fuse link, having link plates integral with and connected by fuse bar means, laced into the load carrying chain member so that a normal tensile load thereon is carried through the fuse bar means, the fuse bar means having a preselected tensile strength less than the tensile strength of the remainder of the load carrying member; and safety link means joining the link plates connected by the fuse bar, the safety link means having a tensile strength at least substantially equal to the tensile strength of the remainder of the load carrying member, to hold the load when the fuse bar means breaks due to overload conditions. In addition, the present invention provides an overload detection and safety device which can be readily adaptable to link chain assemblies, providing a visibly apparent and prompt alarm when overload conditions occur in load systems in which such assemblies are employed.

It is to be understood that various changes can be made by one skilled in the art in the arrangement, form and construction of the novel apparatus disclosed herein, and in the materials utilized, without departing from the scope or spirit of the present invention.

BRIEF DESCRIPTION OF THE DRAWINGS

Referring to the drawings.

DETAILED DESCRIPTION OF THE DRAWINGS

Figure 1:
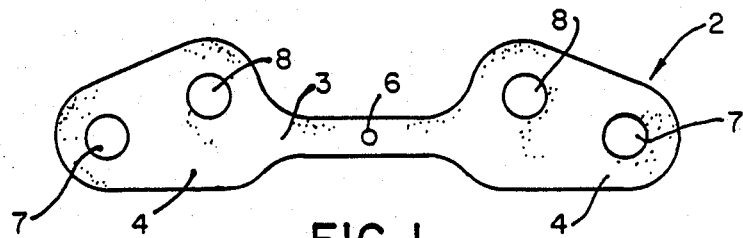
FIG. 1 is a side view of a fuse link incorporating a fuse bar in one advantageous form of the present invention.
Figure 2:
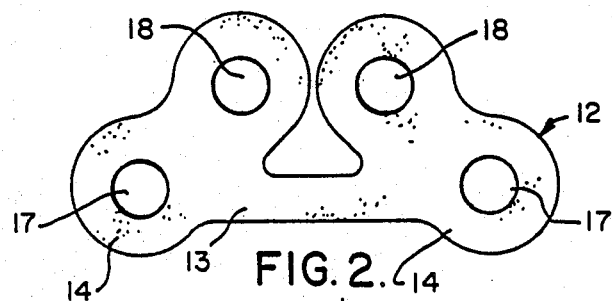
FIG. 2 is a side view of another link plate member incorporating a fuse bar in another form of the present invention.

Referring to FIG. 1 of the drawings, one form of the present invention is disclosed as incorporated in fuse link 2 of a load carrying chain assembly device. Fuse link 2 is provided with a linear extending fuse bar 3 which is narrower and of preselected lesser cross-sectional area than opposed mirror-image plate members 4 of fuse link 2. Fuse bar 3 in the embodiment of FIG. 1 is provided with a suitable preselected weakness aperture 6 to create stress concentration and lower fatigue strength, the fuse bar 3 having a preselected tensile and fatigue strength which advantageously is approximately 60% of the tensile strengths of the link plate members 4 and the other link plate members of the chain without a fuse bar. As for a chain assembly arrangement similar to the chain assembly arrangements described more fully hereinafter for the various embodiments of the invention disclosed in later described FIGS. 2–5, FIGS. 6–9, FIG. 10, FIG. 11, FIG. 12 and FIG. 13, fuse link 2 is provided with mirror-image apertures 7 in the mirror-image link plates 4. These apertures 7 serve to receive suitable press-fitted pins or similar joining members not disclosed in FIG. 1, to join fuse link 2 with its fuse bar 3 to suitable conventional link plate members which are also not disclosed in FIG. 1. Fuse link 2 with fuse bar 3 is further provided with mirror-image apertures 8 which serve to receive suitable press-fitted pins to permit the connecting of suitable safety linkage of tensile strength at least substantially equal to the tensile strengths of the remainder of the link plate member in parallel relationship to fuse bar 3 of lesser tensile strength, all as will also be described more fully for the embodiments described hereinafter. It is to be noted that the link plate extremities 4 of fuse link 2 are of large radii to reduce stress concentration at the areas of connection and to increase the consistency of fuse bar 3 failure. It also is to be noted that the centers of apertures 7 are in alignment with the central longitudinal axis of fuse bar 3 to provide for linear alignment with the link plate members to which fuse link 2 is joined so as to assure uniform linear tensile load therethrough.

Figure 3:
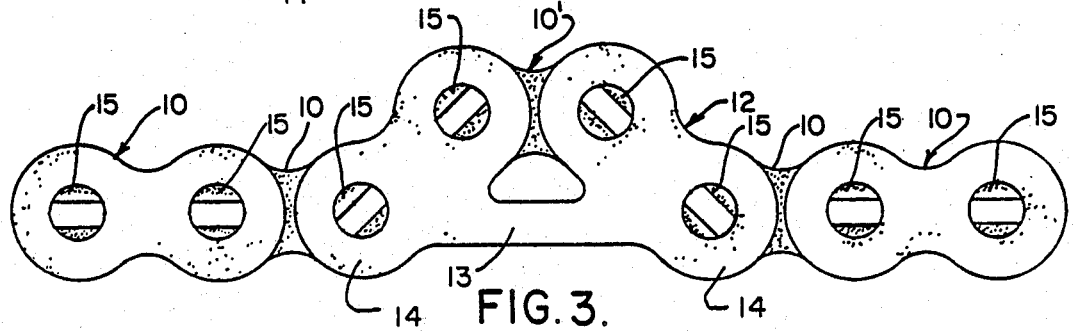
FIG. 3 is a side view of the link plate member of FIG. 2 included as a portion of a load carrying chain assembly with a safety link in place.

Referring to FIGS. 2–5 which teach another embodiment of the present invention of different geometric contour, fuse link 12 is provided with a linear extending fuse bar 13 which, like fuse bar 3 above described, is narrower and of smaller pre-selected cross-sectional area than opposed mirror-image plate member extremities 14 of fuse link 12. In this embodiment, the weakness hole is eliminated and the opposed mirror-image apertures 17 in plate members 14 are closer together since fuse bar 13 is shorter than fuse bar 3 of FIG. 1. As can be seen in FIG. 3, apertures 17 are provided with press-fitted pins 15 to join conventional link plate members 10 without a fuse bar to opposite link plate extremities 14 of fuse link 12. In a manner similar to FIG. 1, fuse link 12 with a fuse bar 13 is further provided with mirror-image apertures 18 which serve to receive suitable press-fitted pins 15 to permit the connection of suitable safety linkage here in the form of a single conventional link plate 10' in parallel relationship to fuse bar 13 of fuse link 12. Unlike fuse link 2 of FIG. 1, it is to be noted that opposed apertures 18 are closer to each other than are opposed apertures 8 of FIG. 1 and thus only one safety link plate 10' is utilized between apertures 8. However, safety link plate 10' is spaced farther from fuse bar 13 than would a plurality of joined safety links be spaced from fuse bar 3 of fuse link 2 and the differences in length between fuse bar and safety link are greater, and thus there will be a greater jerking action with breakage of fuse bar 13 than with breakage of fuse bar 3. It is to be noted that fuse bar 13, like fuse bar 3 can be designed to have a lower tensile and fatigue strength of approximately 60% of the tensile and fatigue strengths of the remainder of the fuse link, the safety link 10' and the conventional link plate members 10 without fuse bars and is in linear alignment with conventional link plate members 10 before breakage to assure linear tensile load therethrough before breakage due to overload conditions.

Figure 4:
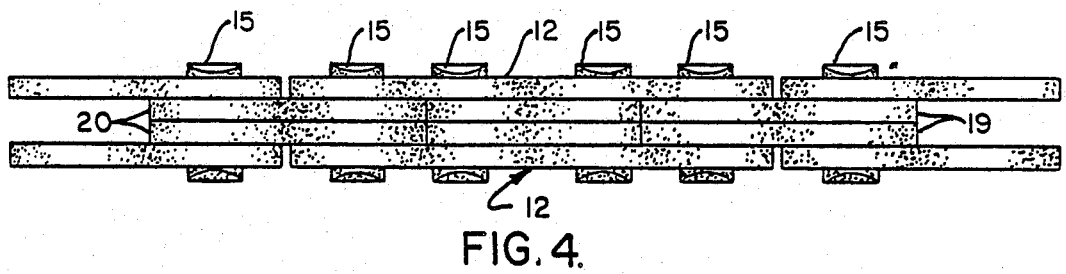
FIG. 4 is a top view of the chain assembly portion of FIG. 3 disclosing the articulated link plate members, as well.
Figure 5:
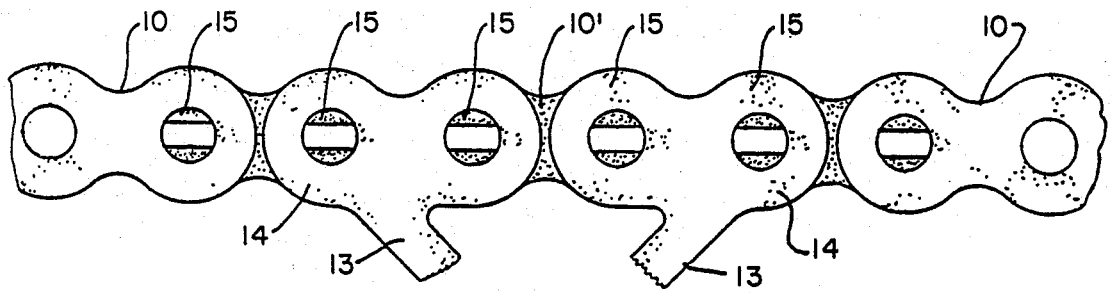
FIG. 5 is a side view similar to the view of FIG. 3 disclosing the failed fuse bar after overload.
Figure 6:
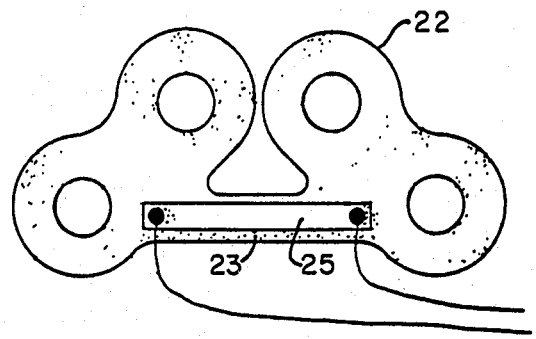
FIG. 6 is a side view of a fuse link similar to that of FIG. 2 incorporating an electrical emergency circuit strip mounted on the fuse bar.
Figure 7:
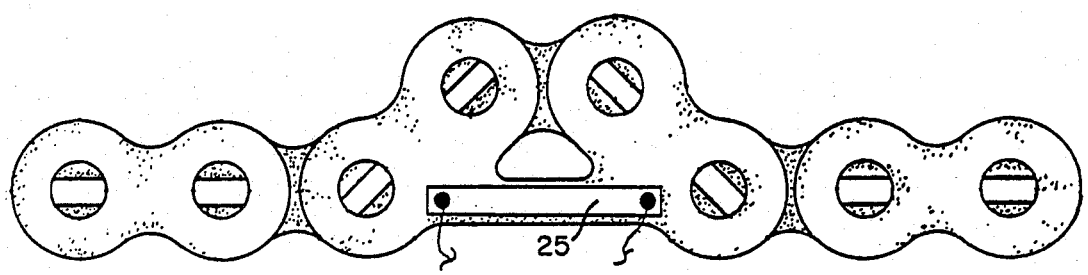
FIG. 7 is a side view of the fuse link of FIG. 6 included as a portion of a load carrying chain assembly with a safety link in place.
Figure 8:
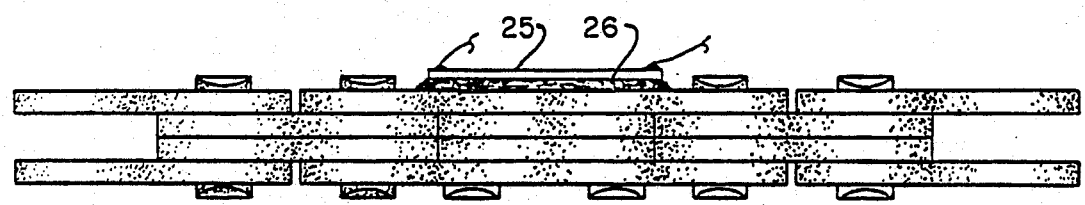
FIG. 8 is a top view of the chain assembly portion of FIG. 7 disclosing the articulated link plate members and the insulation for the electrical emergency circuit strip on the fuse bar.
Figure 9:
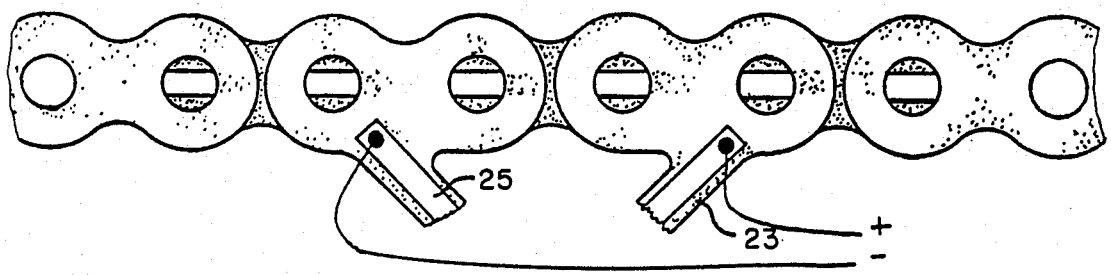
FIG. 9 is a side view of the fuse link of FIG. 7 disclosing the failed fuse bar and electrical circuit strip after overload.

As can be seen in FIG. 4, the chain assembly of FIGS. 2–5, can be arranged in a 2×2 leaf chain lacing arrangement to include articulated link plate members 19, freely mounted on pins 15 between outer link plates of fuse links 12 with their fuse bars 13 linked to conventional link plates 10 and including safety links 10'.

As can be seen in FIGS. 6–9, a fuse link 22 with a fuse bar 23 is disclosed. The arrangement disclosed in these Figures is substantially like that of FIGS. 2–5 except that an electrically conductive emergency strip 25 is mounted on fuse bar 23 by means of a suitably insulating adhesive 26. Emergency strip 25 can be electrically connected to a shut off switch for the load operating mechanism and/or to an alarm (not shown). Accordingly, when strip 25 is broken with the breaking of fuse bar 23 due to an overload condition, the load operating mechanism can be shut-off and/or an alarm sounded and/or visibly shown.

Figure 10:
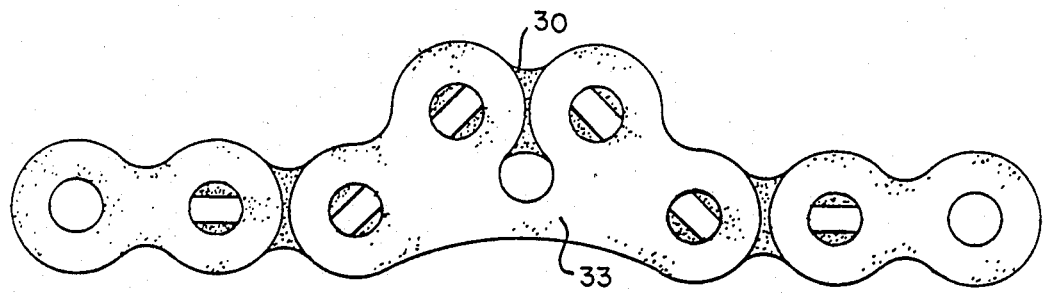
FIG. 10 is a side view of still another geometry for a fuse link of the present invention included as a portion of a load carrying chain assembly and incorporating one safety link.
Figure 11:
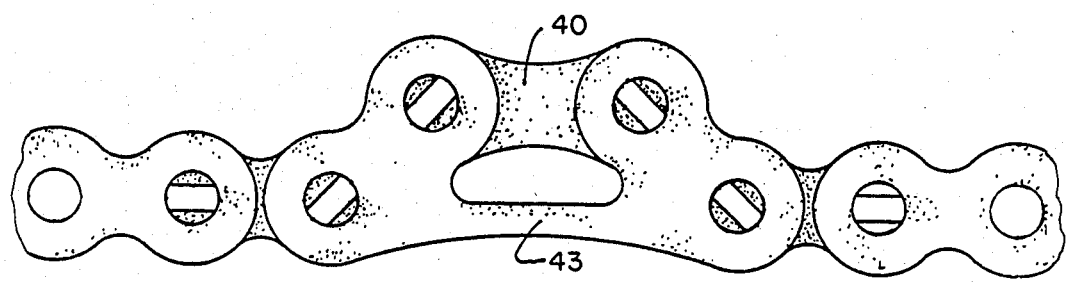
FIG. 11 is a side view of a further geometry for a fuse link of the present invention included as a portion of a load carrying chain assembly, also incorporating one safety link.

Referring to FIGS. 10 and 11, two additional embodiments of the present invention are disclosed. In both FIGS. 10 and 11, fuse bars 33 and 43 respectively are arched, the arch of fuse bar 43 of FIG. 11 being less or softer than the arch of fuse bar 33 of FIG. 10 to reduce stress concentration and the single safety link 30 of FIG. 10 being shorter than single safety link 40 of FIG. 11.

Figure 12:
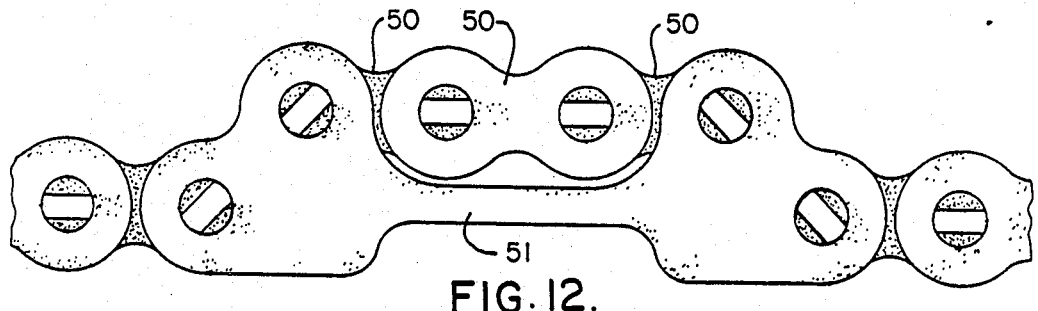
FIG. 12 is a side view of even a further geometry for a fuse link of the present invention incorporating three safety links and included as a portion of a load carrying chain assembly; and, FIG. 13 is a side view of another geometry for a fuse link similar to that of FIG. 12 incorporating three safety links and included as a portion of a load carrying chain assembly.
Figure 13:
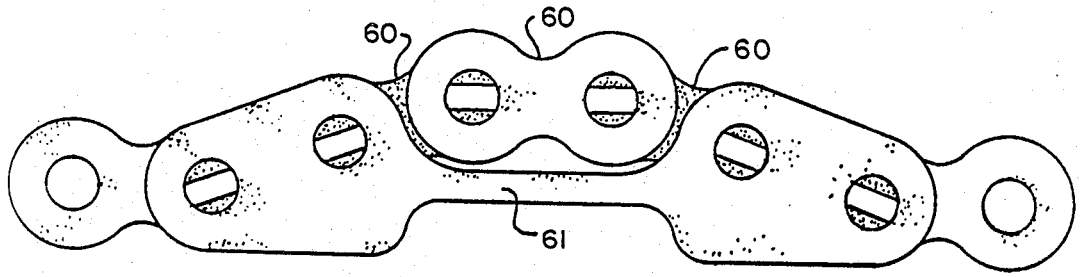

Referring to FIGS. 12 and 13, an additional two embodiments are disclosed. In both FIGS. 12 and 13, three safety links 50 and 60 respectively are utilized with the fuse bars 51 and 61 being respectively longer to accommodate the links. With these two arrangements the differences in length between the safety links and fuse bars is minimized, as is the spacing therebetween, to thus minimize jerking action when overload conditions occur and fuse bars 51 and 61 break due to such overload conditions. In both these arrangements disclosed, the fuse bars are linearly aligned with the conventional link plate members to assure uniform linear tensile load therethrough before fuse bar breakage.

It is to be understood that the several forms of chain assemblies aforedescribed can be formed from any one of several known metals such as iron or steel with the processing procedures for the fuse links which include fuse bar members being similar to conventional link plate members without fuse bar members so that failure modes are of preselected consistency. It further is to be understood that the inventive features of the present invention can be incorporated as part of other cable assembly forms besides the chain assembly forms aforedescribed.

The invention claimed is:

1. An improved chain assembly comprising a plurality of link plate members extending in substantially linear alignment with successive ends thereof positioned in overlapping relation and connected by spaced pin members extending therethrough to form a chain; at least one fuse link laced into other plate members in said chain, said fuse link comprising link plate members connected by a fuse bar means so that normal tensile loads on said chain are carried through said fuse bar means, said fuse bar means having preselected lesser tensile strength than the tensile strengths of the said link plate members connected by said fuse bar and said other link plate members, and safety link means having a tensile strength substantially equal to the tensile strength of said other link plate members, said safety link means connecting said link plate members connected by said fuse bar means, to hold the loads when said fuse bar means breaks due to overload conditions.

2. The chain assembly of claim 1, said fuse bar means having a preselected cross-sectional area less than the link plate members which it connects.

3. The chain assembly of claim 1, said fuse bar means having a lesser preselected fatigue strength than said fuse link link plate members.

4. The chain assembly of claim 1, said fuse bar means having an aperture therein to create preselected stress concentrations and lower preselected fatigue strength.

5. The chain assembly of claim 1, and an electrical emergency circuit attached to said fuse bar means adapted to be interrupted when said fuse bar means breaks to trigger an emergency system connected thereto.

6. The chain assembly of claim 1, the processing procedures for said link plate member with fuse bar means being similar to said other link plate members so that failure modes are of preselected consistency.

7. The chain assembly of claim 1, said fuse bar means being substantially in linear alignment with said other link plate members to provide uniform linear tensile load therethrough.

8. The chain assembly of claim 1, said link plate members connected by said fuse bar means having extremities of large radii to reduce stress concentration at the areas of connection and to increase consistency of fuse bar means failure.

9. The chain assembly of claim 1, the difference in length between said fuse bar means and said shunting safety link means being minimal to reduce chain jerking when said fuse bar means breaks due to overload.

10. The chain assembly of claim 1, said safety link means including at least three links in pin connected overlapping linear shunting alignment to assure that the safety link means carries no load until said fuse bar means breaks.

11. The chain assembly of claim 1, said fuse bar means having an approximate preselected tensile strength of 60% of the tensile strengths of the its link plate members, said safety link and said other link plate members.

12. An improved load carrying device in the form of a chain assembly comprising a plurality of link plate members extending in substantially linear alignment with successive ends thereof positioned in overlapping relation and connected by spaced pin members extending normally therethrough to form a chain; at least one fuse link in said chain, said fuse link including a fuse bar means and link plates connected by said fuse bar means said fuse bar and link plates being integral, said fuse link being laced into said chain so that normal tensile loads on said chain are carried through said fuse bar means; said fuse bar means having a preselected cross-sectional area less than the link plate members which it connects to provide an approximate tensile and fatigue strength of 60% of the tensile strengths of the said link plate members and the other link plate members in said chain and having an electrical emergency circuit insulatively attached thereto to be interrupted when said fuse bar means breaks due to overload conditions to trigger an emergency system connected thereto, the manufacturing processing procedures for the fuse link with said fuse bar means being similar to said other link plate members so that failure modes are of preselected consistency; said fuse bar means being substantially in linear alignment with said link plate members to provide uniform linear tensile loads therethrough and of sufficient length to accommodate at least three safety links in substantially parallel relationship therewith so that the difference in length between said fuse bar means and said safety links in minimal to reduce chain jerking when said fuse bar means breaks; the fuse plate members of said fuse link having extremities of large radii to reduce stress concentration at the areas of connection and increase consistency of fuse bar means failure; and at least three safety links in pin connected overlapping linear substantially parallel alignment with said fuse bar means, said fuse bar link being laced into said chain, said safety links having a tensile strength at least substantially equal to the tensile strengths of its link plate members and said other link plate members to hold the load when said fuse bar means breaks.

13. An improved load carrying device comprising a linear load carrying member including a fuse link having link plate members and fuse bar means connecting said link plate members, said fuse link being laced into said load carrying member so that tensile loads thereon are carried through said fuse bar means, said fuse bar means having a preselected tensile strength less than the tensile strength of the remainer of said load carrying member and being designed to break under predetermined overload conditions; and safety means having a tensile strength at least substanially equal to the tensile strength of said remainder of said load carrying member, said safety means connecting said link plate members substantially parallel to said fuse bar means to hold the load when said fuse bar means breaks due to overload conditions.

* * * * *

UNITED STATES PATENT AND TRADEMARK OFFICE
CERTIFICATE OF CORRECTION

PATENT NO. : 4,578,941

DATED : April 1, 1986

INVENTOR(S) : Roger P. Butterfield

It is certified that error appears in the above-identified patent and that said Letters Patent is hereby corrected as shown below:

Col. 2, line 4, "another link plate member" should be "another fuse link"

Col. 2, line 7, "the link plate member" should be "the fuse link"

Col. 3, line 41, "8" should be "18"

Signed and Sealed this

Twenty-ninth Day of July 1986

[SEAL]

Attest:

Attesting Officer

DONALD J. QUIGG

Commissioner of Patents and Trademarks